United States Patent
Kitani

(10) Patent No.: US 8,208,051 B2
(45) Date of Patent: Jun. 26, 2012

(54) IMAGING APPARATUS AND METHOD FOR CONTROLLING THE SAME

(75) Inventor: Kazunari Kitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 12/147,964

(22) Filed: Jun. 27, 2008

(65) Prior Publication Data

US 2009/0009644 A1    Jan. 8, 2009

(30) Foreign Application Priority Data

Jul. 6, 2007    (JP) ................................ 2007-178534

(51) Int. Cl.
*H04N 3/14* (2006.01)
*H04N 5/335* (2011.01)

(52) U.S. Cl. ........ 348/294; 348/298; 348/302; 348/308; 348/312

(58) Field of Classification Search .................. 348/294, 348/298, 308, 312; 250/208.1; 257/290–292
See application file for complete search history.

(56) References Cited

U.S. PATENT DOCUMENTS

| | | | |
|---|---|---|---|
| 6,515,271 B1 * | 2/2003 | Shimizu | 250/208.1 |
| 6,930,327 B2 * | 8/2005 | Maeda et al. | 257/59 |
| 2001/0030701 A1 * | 10/2001 | Hiyama et al. | 348/304 |
| 2006/0197847 A1 * | 9/2006 | Johnson et al. | 348/229.1 |
| 2006/0259041 A1 * | 11/2006 | Hoffman et al. | 606/139 |
| 2008/0117994 A1 * | 5/2008 | Shetty | 375/257 |

FOREIGN PATENT DOCUMENTS

| | | |
|---|---|---|
| JP | 2000-188720 A | 7/2000 |
| JP | 2002-064753 A | 2/2002 |
| JP | 2005-303673 A | 10/2005 |
| JP | 2006-222834 A | 8/2006 |

* cited by examiner

*Primary Examiner* — Yogesh Aggarwal
(74) *Attorney, Agent, or Firm* — Canon USA Inc. IP Division

(57) ABSTRACT

In an imaging apparatus, a first conversion unit multiplexes input signals including control signals for driving an image sensor to generate a multiplex signal having a frequency higher than those of the input signals. A transfer unit transfers the multiplexed signal generated by the first conversion unit according to low-voltage differential signaling. A reception unit receives the multiplexed signal from the transfer unit. A second conversion unit extracts the control signals for driving the image sensor from the multiplexed signal received by the reception unit. A third conversion unit performs at least one of correction processing and development processing on a signal generated by the image sensor. A signal generation unit generates and supplies processing timing control signals to the first conversion unit and the third conversion unit.

5 Claims, 13 Drawing Sheets

IMAGING APPARATUS AND METHOD FOR CONTROLLING THE SAME

BACKGROUND OF THE INVENTION

1. Field of the Invention

The present invention relates to an imaging apparatus including an image sensor that generates an image signal of a captured object and a timing signal generation circuit that drives the image sensor. Furthermore, the present invention relates to a method for controlling the imaging apparatus.

2. Description of the Related Art

In general, charge-coupled device (CCD) image sensors and complementary metal-oxide semiconductor (CMOS) image sensors are installed on various imaging apparatuses including digital cameras and digital video cameras. An imaging apparatus equipped with an image sensor includes a timing signal generation circuit that supplies a timing signal (control signal) to the image sensor. The timing signal generation circuit has important roles. As discussed in Japanese Patent Application Laid-Open No. 2002-64753, there is a conventional method for reducing the number of input terminals provided for a transfer electrode drive circuit provided in a CCD image sensor.

However, compared to a CCD image sensor, a CMOS image sensor requires a large number of control terminals to enable an imaging apparatus to operate as intended. The package for a CMOS image sensor is relatively large. The number of terminals substantially determines the outer shape of a package accommodating an image sensor and restricts the chip area of the image sensor.

If the number of terminals provided for an image sensor is large, the number of wiring lines connecting the image sensor to a timing signal generation circuit increases correspondingly. Therefore, the conventional method encounters with the difficulty in mounting constituent parts of an imaging apparatus and determining the layout of the parts. Furthermore, when the number of terminals provided for an image sensor is large, the number of output terminals of the timing signal generation circuit is large. As a result, a package of the image sensor includes numerous pins as much as the number of terminals required. The cost of the package increases.

Moreover, if numerous wiring lines are provided for transmitting control signals to an image sensor that can operate at a higher speed comparable to the CMOS level, a peripheral analog signal (e.g., output signal of the image sensor) may include a noise component. A peripheral circuit (e.g., analog processing circuit, analog-to-digital (A/D) converter, etc.) may operate undesirably due to noise. On the other hand, if the driving ability of a timing signal generation circuit that outputs control signals is decreased, the image sensor may not be driven at a designated speed. Therefore, the image sensor and the timing signal generation circuit are closely disposed to each other. The layout of parts is restricted greatly as described above.

Moreover, a CMOS image sensor may include a timing signal generation circuit and an image sensor formed on the same chip. However, the timing signal generation circuit supplies clock signals not only to the image sensor but also to an A/D converter and a digital signal processor (DSP). Therefore, the clock signal may generate noises having adverse effects on the image sensor. Thus, implementing the above-described conventional method is difficult.

SUMMARY OF THE INVENTION

Exemplary embodiments of the present invention are directed to an imaging apparatus capable of reducing the number of terminals between an image sensor and a signal generation unit, improving transmission characteristics, and reducing noises generated from the signal generation unit. Furthermore, exemplary embodiments of the present invention are directed to a method for controlling the imaging apparatus.

According to an aspect of the present invention, an imaging apparatus includes a first conversion unit configured to multiplex input signals including control signals for driving an image sensor to generate a multiplexed signal having a frequency higher than those of the input signals; a transfer unit configured to transfer the multiplexed signal generated by the first conversion unit according to low-voltage differential signaling; a reception unit configured to receive the multiplexed signal from the transfer unit; a second conversion unit configured to extract the control signals for driving the image sensor from the multiplexed signal received by the reception unit; a third conversion unit configured to perform at least one of correction processing and development processing on a signal generated by the image sensor; and a signal generation unit configured to generate and supply processing timing control signals to the first conversion unit and the third conversion unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

DETAILED DESCRIPTION OF THE EMBODIMENTS

Figure 1:
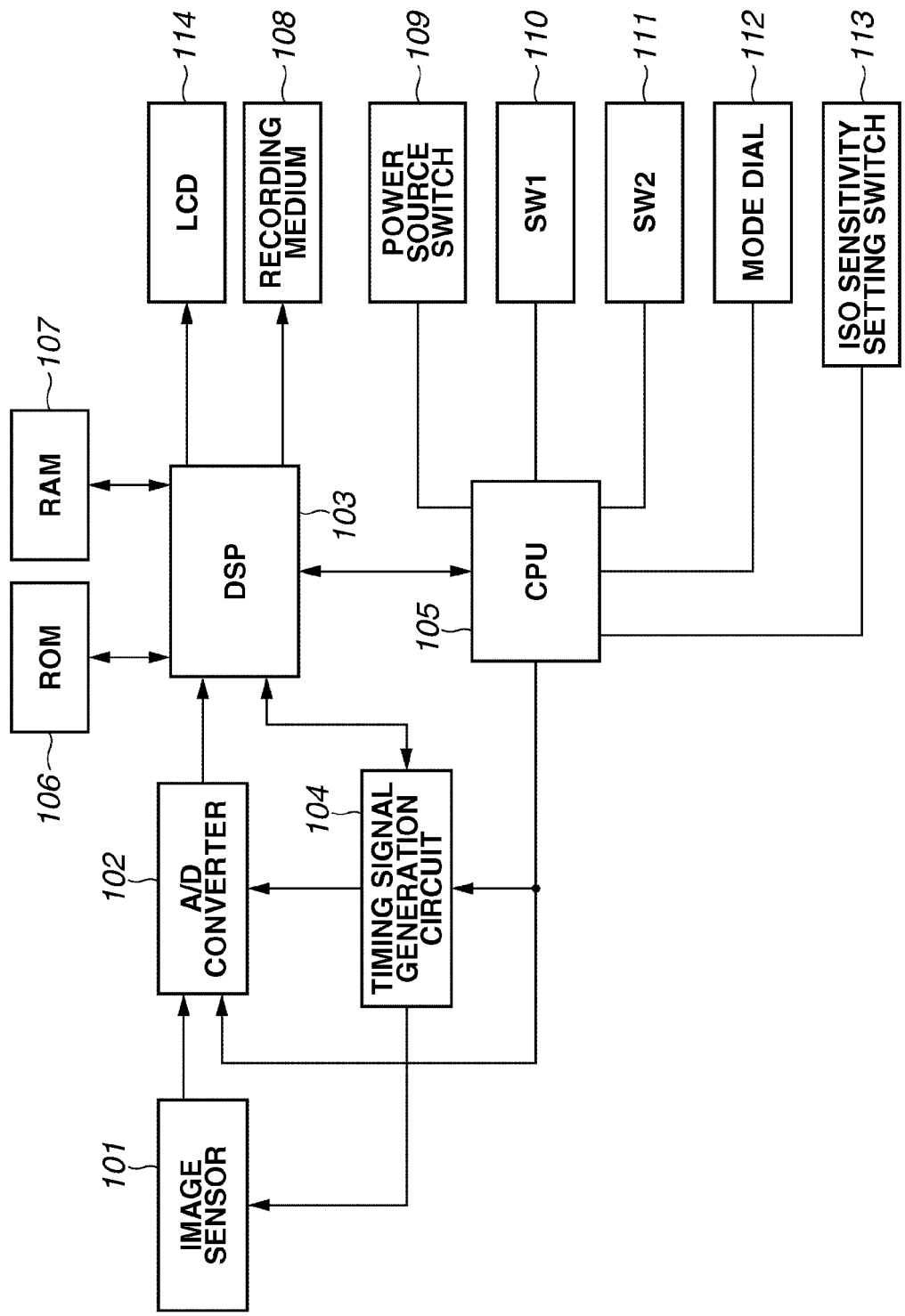
FIG. 1 is a block diagram illustrating an example configuration of a digital camera, which serves as an imaging apparatus according to a first exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

FIG. 1 is a block diagram illustrating an example configuration of a digital camera, which serves as an imaging apparatus according to a first exemplary embodiment of the present invention.

The digital camera illustrated in FIG. 1 includes an imaging optical system (not illustrated), an image sensor 101, an analog-to-digital (A/D) converter 102, a digital signal processor (DSP) 103 for image processing, a timing signal generation circuit 104, a central processing unit (CPU) 105, a read-only memory (ROM) 106, a random access memory (RAM) 107, and a recording medium 108. Furthermore, the digital camera includes a power source switch 109, a first shutter switch (SW1) 110, a second shutter switch (SW2) 111, a mode dial 112, an ISO sensitivity setting switch 113, a display unit (LCD) 114, a photometry control unit (not illustrated), and a range-finding control unit (not illustrated).

When the imaging optical system (not illustrated) forms an optical image of an object in a shooting operation, the image sensor 101 converts the optical image into an image signal. Namely, the image sensor 101 performs photoelectric conversion processing on an input optical image. According to an exemplary embodiment, the image sensor 101 is a CMOS image sensor that outputs an analog image signal. The A/D converter 102 receives an analog image signal from the image sensor 101 and converts the input analog image signal into a digital image signal.

When the DSP 103 receives a digital image signal (image data) from the A/D converter 102, the DSP 103 performs various processing including correction processing and development processing on the received image data based on data stored in the ROM 106 using the RAM 107. The DSP 103 controls the ROM 106, the RAM 107, and other storage media. The DSP 103 performs processing for writing image data into the recording medium 108.

Under the control of the CPU 105, the timing signal generation circuit 104 supplies clock signals and control signals to the image sensor 101, the A/D converter 102, and the DSP 103. The timing signal generation circuit 104 is connected to the image sensor 101 according to low-voltage differential signaling (LVDS). An example connection status between the timing signal generation circuit 104 and the image sensor 101 according to low-voltage differential signaling is described below with reference to FIG. 6.

The CPU 105 controls the DSP 103 and the timing signal generation circuit 104, and controls camera function units that perform various imaging operations including photometry and range-finding operations. The CPU 105 executes various processing according to detection signals received from the power source switch 109, the first shutter switch (SW1) 110, the second shutter switch (SW2) 111, the mode dial 112, and the ISO sensitivity setting switch 113. The CPU 105 executes operation settings for the A/D converter 102 via a serial communication port. The CPU 105 executes various processing based on control programs (for example, as indicated by a flowchart illustrated in FIG. 2) stored in the ROM 106.

The ROM 106 stores various control program(s) used for image processing and various correction data. The RAM 107 temporarily stores image data and correction data processed by the DSP 103. The RAM 107 can realize access processing at a speed faster than that of the ROM 106. The recording medium 108 is, for example, a CompactFlash® card that can store captured image data and is detachably connected to the digital camera via a connector (not illustrated).

The power source switch 109 enables a user to instruct an operation start of the digital camera. When a user presses the first shutter switch (SW1) 110, the digital camera starts photometry processing and/or range-finding processing. When the user presses the second shutter switch (SW2) 111, the digital camera starts a series of imaging operations, which include driving a mirror and a shutter (not illustrated) and writing a signal read by the image sensor 101 into the recording medium 108 via the A/D converter 102 and the DSP 103.

The mode dial 112 enables a user to set an operation mode for the digital camera, which can be selected from among various operation modes (a shooting mode for capturing an image of an object, a recording mode for recording captured image data on the recording medium 108, etc.). The ISO sensitivity setting switch 113 enables a user to set ISO sensitivity. The display unit (LCD) 114 displays an image based on image data processed by the DSP 103.

An example operation performed by the above-described digital camera according to an exemplary embodiment is described below with reference to FIGS. 2 through 7.

Figure 2:
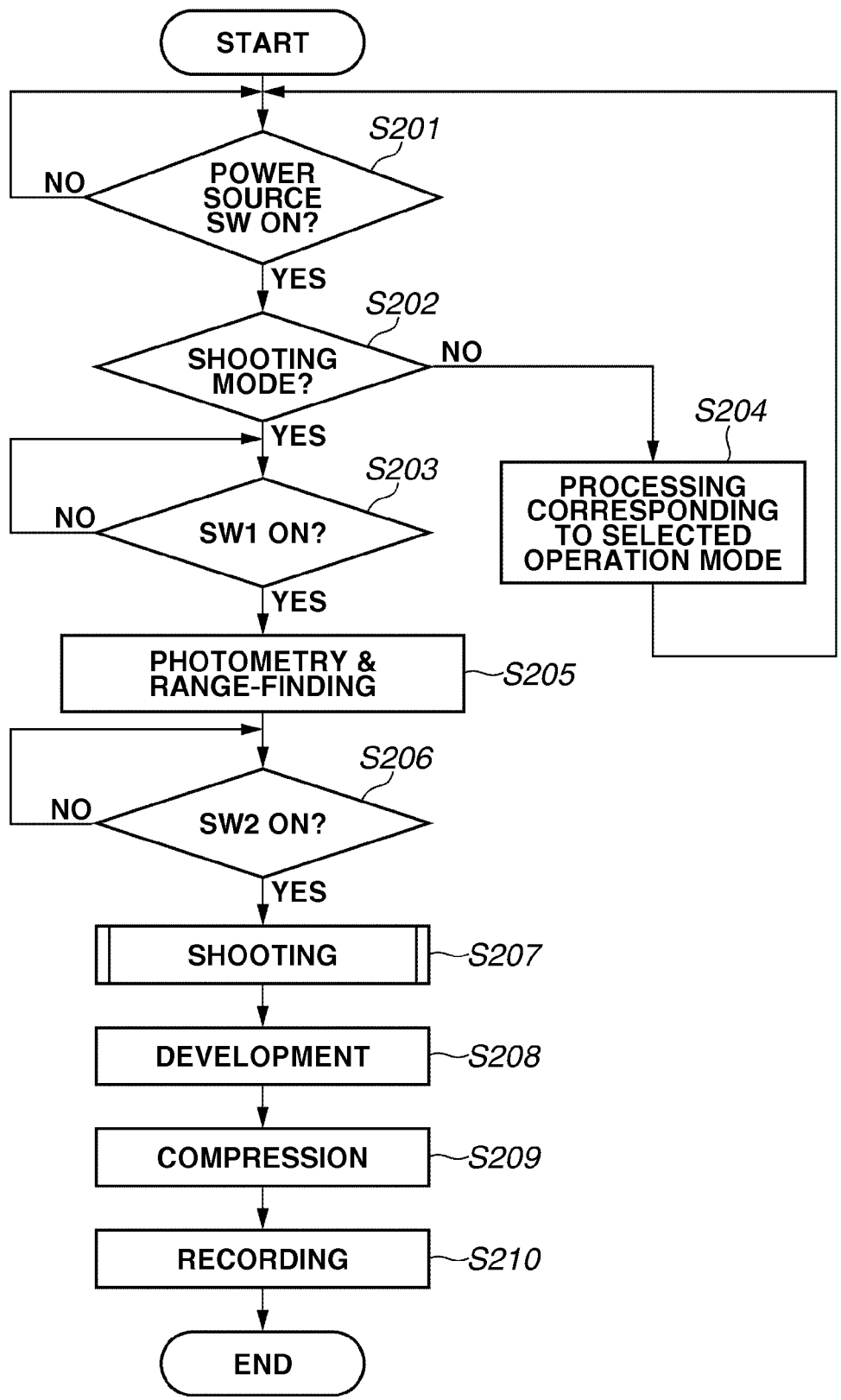
FIG. 2 is a flowchart illustrating example processing performed by a digital camera, which includes a series of imaging operations, including photometry/range-finding processing and recording processing.

FIG. 2 is a flowchart illustrating example processing performed by the digital camera that includes a series of imaging operations, which include photometry/range-finding processing and recording processing.

In step S201, the CPU 105 determines whether the power source SW 109 is in ON state, namely whether the digital camera starts its operation. If the power source SW 109 is in OFF state (NO in step S201), the CPU 105 repeats the determination in step S201. If the power source SW 109 is ON state (YES in step S201), the processing proceeds to step S202.

In step S202, the CPU 105 determines whether the mode dial 112 is set to the shooting mode. If the mode dial 112 is set to the shooting mode (YES in step S202), the processing proceeds to step S203. If the mode dial 112 is set to another operation mode (NO in step S202), the processing proceeds to step S204. In step S204, the CPU 105 executes processing corresponding to the selected operation mode. Then, the processing returns to step S201.

In step S203 (when the mode dial 112 is set to the shooting mode), the CPU 105 determines whether the first shutter switch (SW1) 110 is in ON state. If the first shutter switch (SW1) 110 is in OFF state (NO in step S203), the CPU 105 repeats the determination in step S203. If the first shutter switch (SW1) 110 is in ON state (YES in step S203), the processing proceeds to step S205. In step S205, the CPU 105 causes the photometry control unit (not illustrated) to perform photometry processing for determining an aperture value and a shutter speed and causes the range-finding control unit (not illustrated) to perform range-finding processing for adjusting the focus of a photographic lens to an object to be shot.

In step S206 (after completing the photometry processing and the range-finding processing), the CPU 105 determines whether the second shutter switch (SW2) 111 is in ON state. If the second shutter switch (SW2) 111 is in OFF state (NO in step S206), the CPU 105 repeats the determination in step S206. If the second shutter switch (SW2) 111 is in ON state (YES in step S206), the processing proceeds to step S207. In step S207, the CPU 105 causes the imaging optical system and the image sensor 101 to execute shooting processing as described below. After completing the shooting processing, the processing proceeds to step S208.

In step S208, the CPU 105 instructs the DSP 103 to perform development processing on image data captured by the image sensor 101. In step S209, the CPU 105 instructs the DSP 103 to perform compression processing on image data subjected to the development processing. Then, the CPU 105 instructs the RAM 107 to store the compressed image data. In step S210, the CPU 105 reads image data from the RAM 107 and executes recording processing for recording the image data on the recording medium 108. After completing the image data recording processing, the processing returns to step S201 for preparing the next shooting operation.

An example configuration of the image sensor 101 and control signals relating to the shooting processing performed in step S207 of FIG. 2 are described below.

In general, compared to a CCD image sensor, a CMOS image sensor requires a large number of control terminals for pixel selection. Furthermore, according to characteristics of a CMOS image sensor, the number of control signals tends to increase according to the number of integrated functions.

Figure 3:
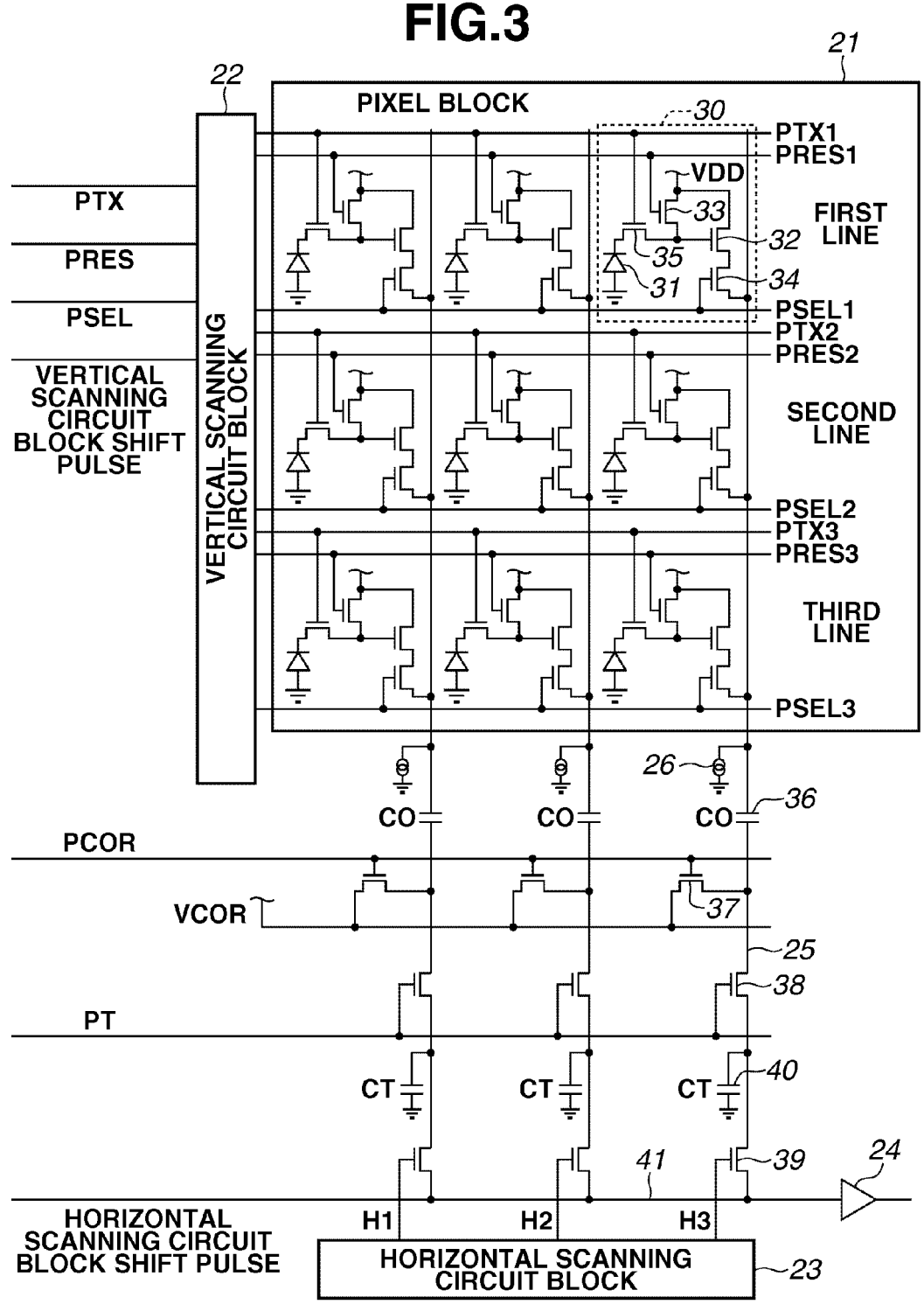
FIG. 3 is a block diagram illustrating an example imaging block of an image sensor.

FIG. 3 is a block diagram illustrating an example imaging block of the image sensor 101.

The image sensor 101 illustrated in FIG. 3 includes a pixel block 21, a vertical scanning circuit block 22, a horizontal scanning circuit block 23, an output amplifier 24, vertical output lines 25, and a horizontal output line 41. The pixel block 21 includes, for example, a total of nine pixels 30 (i.e., nine unit pixels) arranged in a 3×3 matrix pattern. Each unit pixel 30 includes a photodiode 31, an amplifying metal-oxide semiconductor field effect transistor (MOSFET) 32, a reset switch 33, a line selection switch 34, and a pixel transfer switch 35. In FIG. 3, similar reference numerals used for only one unit pixel 30 can be applied to other unit pixels.

The photodiode 31 is a photoelectric conversion element capable of converting input light into an electric signal. The amplifying MOSFET 32 amplifies an output signal from the photodiode 31. The reset switch 33 resets an input of the amplifying MOSFET 32 to a predetermined voltage. The line selection switch 34 controls electric connection between the source electrode of the amplifying MOSFET 32 and the vertical output line 25. The pixel transfer switch 35 controls electric connection between the photodiode 31 and the gate electrode of the amplifying MOSFET 32.

A current source 26, a clamp capacity (CO) 36, a clamp switch 37, a transfer switch 38, a horizontal transfer switch 39, and a storage capacity (CT) 40 are operative as a unit configured to drive each vertical output line 25 provided for each column of the pixel block 21. The vertical scanning circuit block 22 receives pixel transfer pulse PTX, pixel reset pulse (PRES), line selection pulse (PSEL), and vertical scanning circuit block shift pulse. Clamp pulse (PCOR) is supplied to the base terminal of the clamp switch 37.

The following is an example method for reading information from a unit pixel of the image sensor 101 illustrated in FIG. 3. Prior to reading a unit pixel, a photoelectric charge is stored in the photodiode 31 when a predetermined exposure time has elapsed. The first line is selected according to a vertical scanning circuit block shift pulse (hereinafter, referred to as "PV"), which is generated in synchronism with a horizontal sync signal.

First, the vertical scanning circuit block 22 receives a pixel reset pulse PRES1 that changes from high (H) level to low (L) level, which releases reset of the gate electrode of the amplifying MOSFET 32 in a pixel of the pixel block 21. In this case, a voltage corresponding to a dark state of the pixel is stored in a parasitic capacity (hereinafter, referred to as "CFD") of a pixel including the gate electrode of the amplifying MOSFET 32.

Subsequently, the vertical scanning circuit block 22 receives a line selection pulse PSEL1 that rises to H level. A dark-state output appears on the vertical output line 25. In this case, the clamp pulse (PCOR) holds H level for a predetermined time and falls to L level. As a result, the dark-state output on the vertical output line 25 is clamped as a reference value.

Next, in the above-described pixel of the pixel block 21, the pixel transfer switch 35 maintains H level for a predetermined duration. Photoelectric charge stored in the photodiode 31 is transferred to the gate electrode of the amplifying MOSFET 32. Accordingly, a light-state output appears on the vertical output line 25. Through the above-described operation, a light-state output is written into the storage capacity 40 while a dark-state output of each column is clamped as a reference value.

Thereafter, the horizontal scanning circuit block 23 generates scanning pulses H1-H3 in response to a horizontal scanning circuit block shift pulse (hereinafter, referred to "PH") to successively turn on the horizontal transfer switch 39 of the selected column. Accordingly, the signal held in the storage capacity 40 is supplied to the output amplifier 24 via the horizontal output line 41. The output amplifier 24 outputs the signal.

Figure 4:
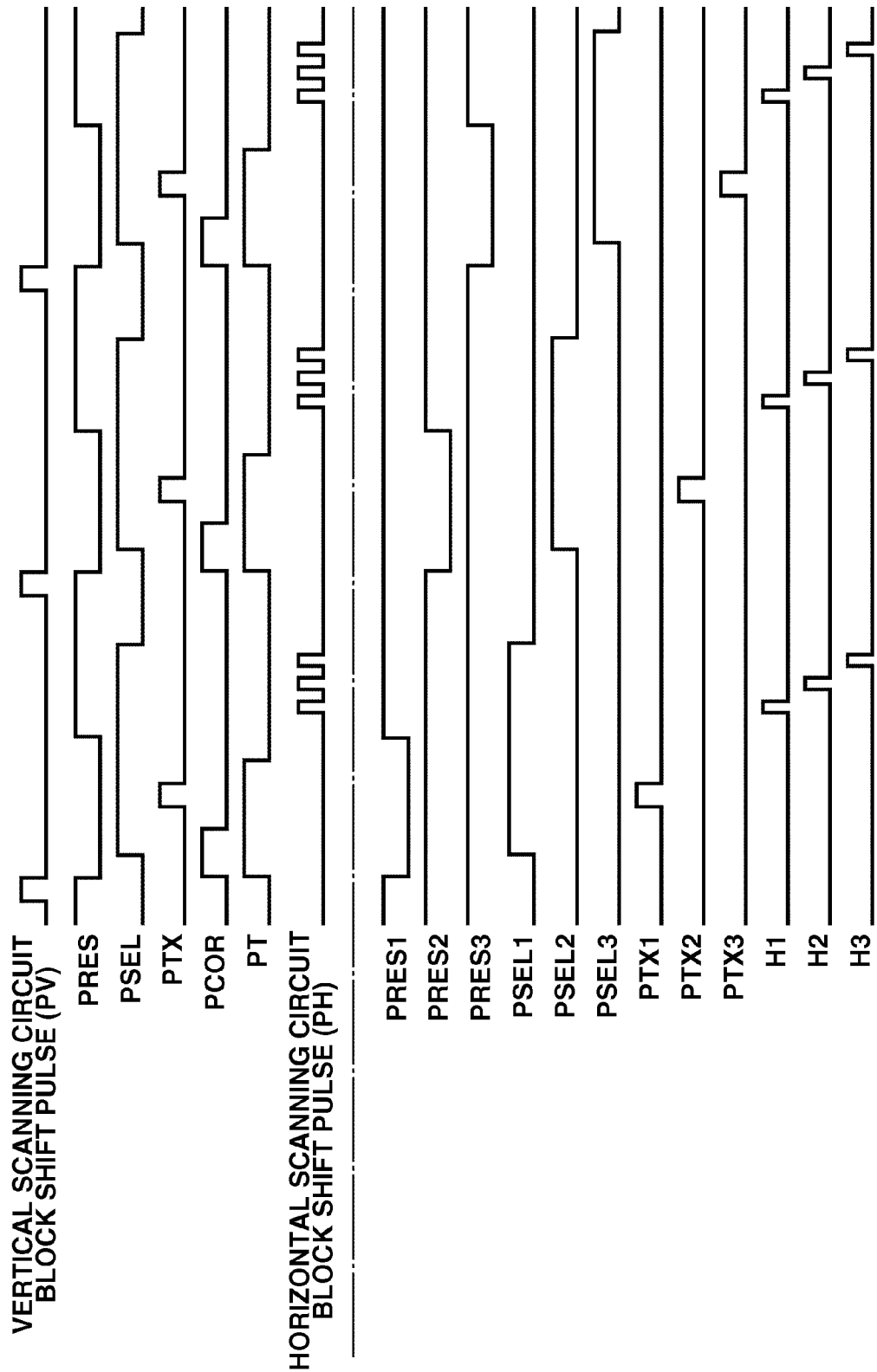
FIG. 4 is a timing diagram illustrating control signals used for driving an image sensor.

Through the above-described processing, the image sensor 101 accomplishes the processing for reading information from a unit pixel connected to the first line in the pixel block 21. Similarly, the vertical scanning circuit block 22 receives PV for the remaining lines (second and third lines) to successively read information from unit pixels connected to the second and third lines in synchronism with scanning pulses H1-H3 supplied from the horizontal scanning circuit block 23. Thus, the image sensor 101 completes the reading operation for all unit pixels. FIG. 4 illustrates example waveforms of control signals supplied to the pixel block 21 of the image sensor 101.

FIG. 4 is a timing diagram illustrating control signals used for driving the image sensor 101.

In FIG. 4, pulses PRES, PCOR, PSEL, PT, PTX, PV (vertical scanning circuit block shift pulse for selecting an object line), and PH (horizontal scanning circuit block shift pulse for selecting an object column) are control signals supplied to the imaging block of the image sensor 101. Furthermore, pulses PRES1-PRES3, PSEL1-PSEL3, PTX1-PTX3, and H1-H3 are internal timing signals generated by the imaging block in response to the control signals.

The timing signal generation circuit 104 includes a timing generator unit 1041 (see FIG. 6), which generates the control signals PRES, PCOR, PSEL, PT, PTX, PV, and PH for driving the image sensor 101.

Figure 5:
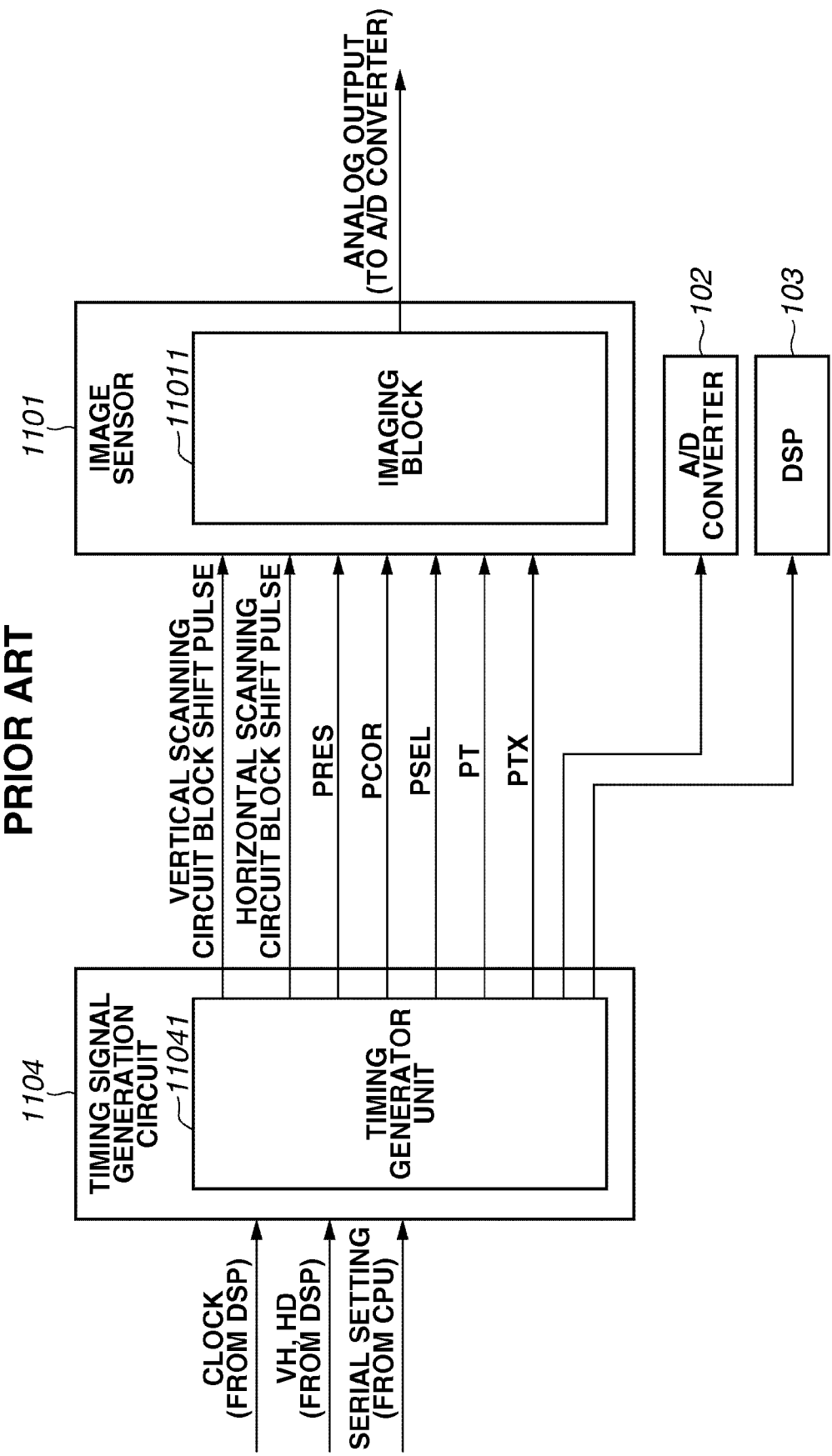
FIG. 5 is a block diagram illustrating a conventional connection status between an image sensor and a timing signal generation circuit.

A conventional circuit configuration illustrated in FIG. 5 performs signal processing for directly supplying control signals generated by a timing generator unit 11041 of a timing signal generation circuit 1104 to an imaging block 11011 of an image sensor 1101. An exemplary embodiment performs signal processing illustrated in FIG. 6.

Figure 6:
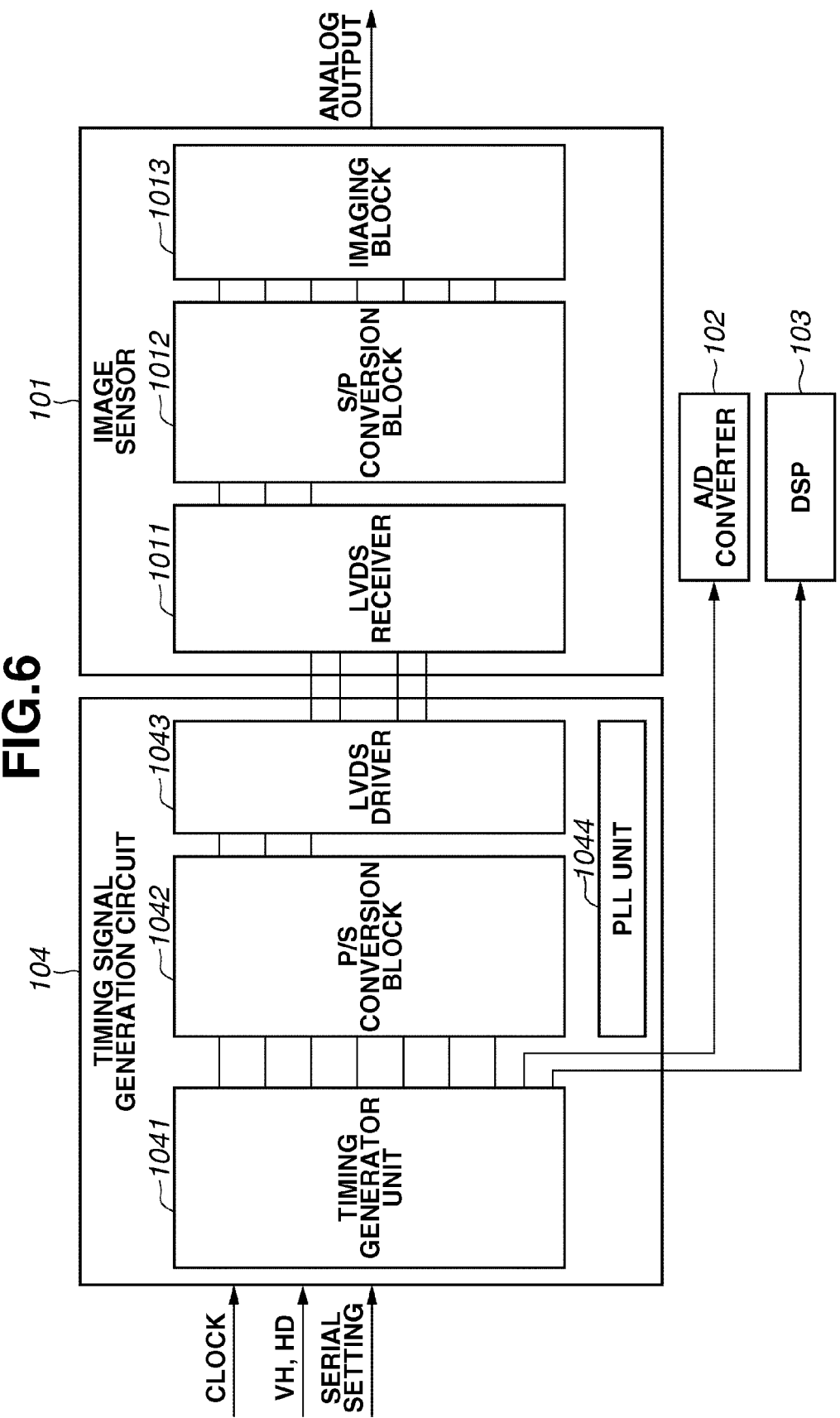
FIG. 6 is a block diagram illustrating an example connection status between an image sensor and a timing signal generation circuit according to an exemplary embodiment of the present invention.

FIG. 6 is a block diagram illustrating an example connection status between the image sensor 101 and the timing signal generation circuit 104.

The image sensor 101 illustrated in FIG. 6 includes a low-voltage differential signaling (LVDS) receiver 1011, a serial/parallel (S/P) conversion block 1012, and an imaging block 1013, which are formed on the same semiconductor chip. The timing signal generation circuit 104 includes a timing generator unit 1041, a parallel/serial (P/S) conversion block 1042, a low-voltage differential signaling (LVDS) driver 1043, and a phase-locked loop (PLL) unit 1044, which are formed on the same semiconductor chip. The PLL unit 1044 includes a phase-locked loop (PLL) circuit.

The timing signal generation circuit 104 generates a plurality of control signals (PRES, PCOR, PSEL, PT, PTX, PV, and PH) to drive the image sensor 101. The PLL unit 1044 generates a clock signal having a frequency higher than operation frequencies of the control signals generated by the timing signal generation circuit 104.

The P/S conversion block 1042 multiplexes a plurality of control signals according to a generated clock signal, in the PLL unit 1044, to generate a serial multiplexed signal. The P/S conversion block 1042 further outputs a clock signal (serial transfer clock). The serial transfer clock is used to extract, from a multiplexed signal, signals for controlling the imaging block 1013. The LVDS driver 1043 transfers the serial multiplexed signal to the image sensor 101 according to low-voltage differential signaling (LVDS).

In the image sensor 101, the LVDS receiver 1011 receives a multiplex signal transferred from the timing signal generation circuit 104. The S/P conversion block 1012 generates parallel signals from the input multiplex signal to extract original control signals for driving the image sensor 101.

As illustrated in FIG. 6, an exemplary embodiment performs the following control to reduce the number of wiring lines (the number of terminals) between the image sensor 101 and the timing signal generation circuit 104 illustrated in FIG. 5. More specifically, the timing signal generation circuit 104 outputs the above-described control signals according to low-voltage differential signaling (LVDS). The image sensor 101 converts an input signal into parallel data to extract original control signals.

In the timing signal generation circuit 104, the timing generator unit 1041 generates control signals (PRES, PCOR, PSEL, PT, PTX, PV, and PH). The timing signal generation circuit 104 further generates an analog front end (AFE) control timing signal and an AFE output fetch timing signal. The timing signal generation circuit 104 outputs the AFE control timing signal to the A/D converter 102. The timing signal generation circuit 104 outputs the AFE output fetch timing signal to the DSP 103.

There are many methods for generating serial data or generating a serial clock in transmitting a control signal according to low-voltage differential signaling (LVDS). The following is an example method using one channel for a data signal and one channel for a clock signal.

First, in the timing signal generation circuit 104, the P/S conversion block 1042 performs sampling on control signals (PRES, PCOR, PSEL, PT, PTX, PV, and PH) at the same time to obtain parallel data and multiplexes the obtained parallel data into serial data. The P/S conversion block 1042 generates serial data by adding two start bits and one stop bit to the above-described control signals. More specifically, the P/S conversion block 1042 generates 10-bit serial data during one period of the reference clock. The 10-bit serial data includes seven bits of sampled data, two start bits, and one stop bit.

The PLL unit 1044 generates a multiplied clock equivalent to 10 times the reference clock, so that the generated multiplied clock (PLL output) can be used to successively switch serial data. The P/S conversion block 1042 generates and outputs the PLL output as a serial transfer clock signal (hereinafter, referred to as "serial transfer clock").

Figure 7:
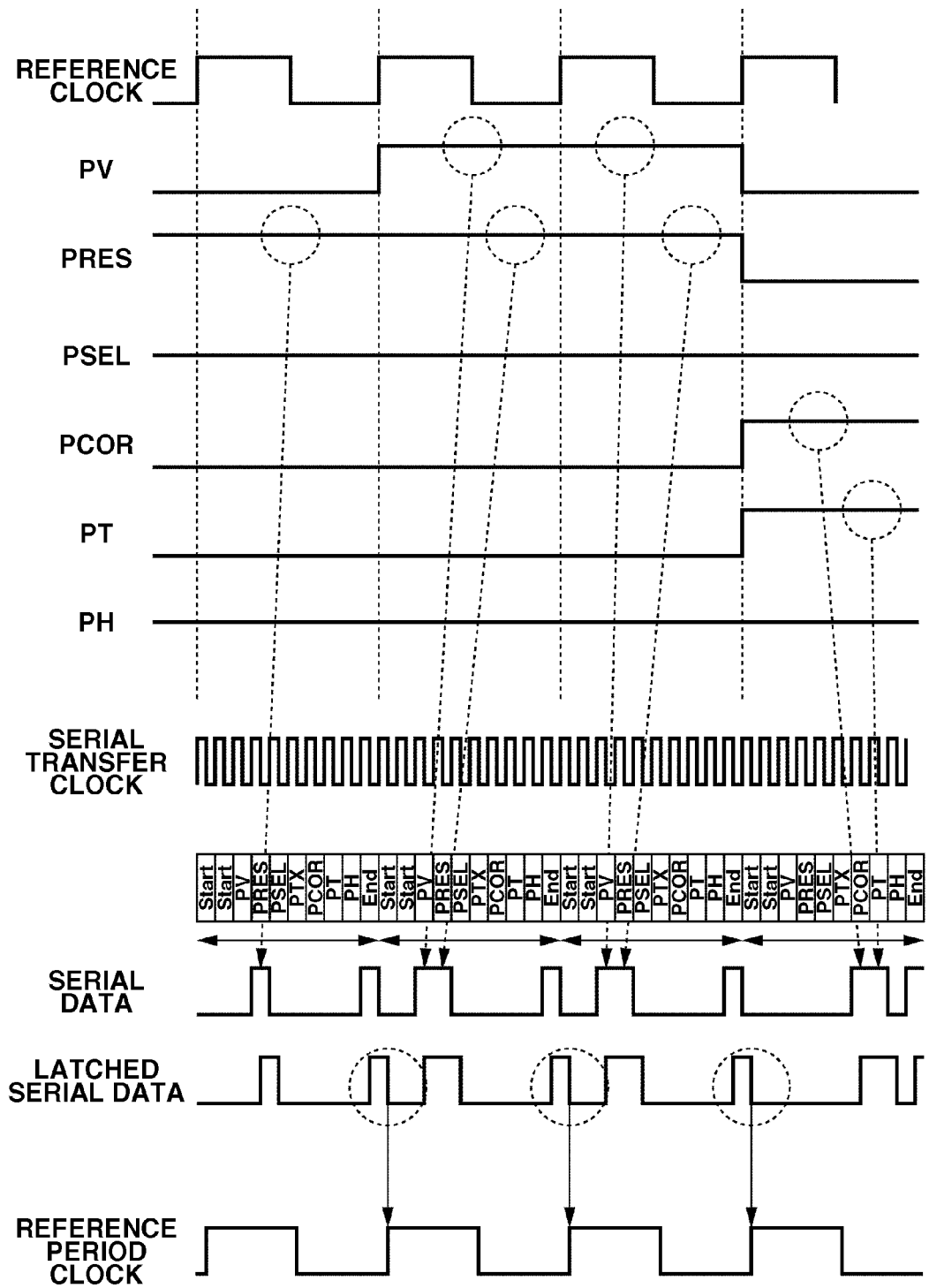
FIG. 7 is a timing diagram illustrating example generation of serial and parallel data.

FIG. 7 is a timing diagram illustrating example generation of serial and parallel data.

As illustrated in FIG. 7, an exemplary embodiment multiplexes two start bits of L level, control signals PV, PRES, PSEL, PTX (not illustrated), PCOR, PT, and PH, and one stop bit of H level into serial data according to a serial transfer clock equivalent to 10 times the reference clock.

To simplify the description, FIG. 7 illustrates serial data and control signals that are generated without any delay. However, an actual circuit performs various processing (e.g., sampling, rearranging, timing adjustment, etc.) on control signals. Therefore, there is a significant delay between generation of control signals and generation of serial data.

As described above, in the timing signal generation circuit 104, the P/S conversion block 1042 outputs a serial data signal and a serial transfer clock signal to the LVDS driver 1043 (see FIG. 6). The LVDS driver 1043 supplies the serial data signal and the serial transfer clock signal to the image sensor 101 according to low-voltage differential signaling (LVDS). Accordingly, the timing signal generation circuit 104 and the image sensor 101 are connected with a total of two channels (one channel for the data signal and one channel for the clock signal). Thus, an exemplary embodiment can connect the timing signal generation circuit 104 and the image sensor 101 with four wiring lines.

The timing signal generation circuit 104, when performing low-voltage differential signaling (LVDS), can stably transfer a data signal without causing noises because the serial transfer clock used for data transmission is 10 times faster than the reference clock used for driving the image sensor 101.

The timing signal generation circuit 104 generates control signals whose amplitudes are not different from those described in the conventional circuit. Therefore, the driving ability required for the timing signal generation circuit 104 is as low as driving ability required for transmitting control signals within the same semiconductor chip. Therefore, compared to a case where an image sensor is driven by an output (control signals) of a semiconductor chip, the timing signal generation circuit 104 according to an exemplary embodiment can drive an image sensor without using so large driving ability and can reduce the amount of noises that are generated by the control signals.

The image sensor 101 receives a low-voltage differential signal (LVDS signal) from the timing signal generation circuit 104 in the following manner.

As illustrated in FIG. 6, the image sensor 101 includes three functional units, i.e., the LVDS receiver 1011, the S/P conversion block 1012, and the imaging block 1013. The LVDS receiver 1011 receives a low-voltage differential signal (serial data) from the timing signal generation circuit 104. The S/P conversion block 1012 converts serial data into parallel data. The imaging block 1013 operates according to a driving signal that is not different from that used in the conventional circuit.

The LVDS receiver 1011, the S/P conversion block 1012, and the imaging block 1013 are formed on the same semiconductor chip as elements constituting the image sensor 101. A CMOS image sensor operates at a low-voltage and can be manufactured together with function elements according to the same processes. Therefore, forming all of the imaging block 1013, the LVDS receiver 1011, and the S/P conversion block 1012 on the same semiconductor chip is relatively easy.

In the image sensor 101, the LVDS receiver 1011 receives a low-voltage differential signal and converts the received signal into a single end signal. Then, the S/P conversion block 1012 generates parallel data from the data signal and the serial transfer clock. The S/P conversion block 1012 latches a data signal in response to the serial transfer clock, thereby fetching each bit. According to the timing diagram illustrated in FIG. 7, an exemplary embodiment latches the serial data in synchronism with a fall edge of the serial transfer clock and, therefore, can latch the serial data at appropriate timing.

The image sensor 101 detects, from an input bit stream, a start-bit part having two bits and a stop-bit part having only one bit. The image sensor 101 divides the bit stream into a plurality of reference periods by detecting the data appearing at a predetermined period (reference clock period), as illustrated in FIG. 7.

As described above, an example embodiment can extract control signals from a bit stream sampled in every reference period and output the control signals for each detected reference period. Thus, the embodiment can extract control signals that are not subjected to the P/S conversion. The embodiment uses the extracted parallel control signals to control the imaging block 1013 in the image sensor 101. The image sensor 101 can perform an ordinary operation.

As described above, an exemplary embodiment can reduce the number of terminals required for transmitting control signals from the timing signal generation circuit 104 to the image sensor 101 according to low-voltage differential signaling and can improve transmission characteristics between the timing signal generation circuit 104 and the image sensor 101. Furthermore, an exemplary embodiment can reduce power consumption in the timing signal generation circuit 104.

As described above, transmitting control signals according to low-voltage differential signaling can reduce noises emitted from the timing signal generation circuit 104 and suppress adverse effects of harmonic noises. Furthermore, suppressing adverse effects caused by harmonic noises can obtain high-quality image data.

As described above, transmitting control signals according to low-voltage differential signaling can increase the degree of freedom in determining the layout of the image sensor 101 and the timing signal generation circuit 104 mounted together on a circuit board in an imaging apparatus, and can increase the degree of freedom in mechanism design for an imaging apparatus.

As described above, transmitting control signals according to low-voltage differential signaling can greatly reduce the number of input terminals required for the image sensor 101. Thus, an exemplary embodiment can downsize a package of the image sensor 101 and reduce a semiconductor chip area of the image sensor 101.

An example embodiment forms the S/P conversion block 1012 and the imaging block 1013 on the same semiconductor chip of the image sensor 101. The parallel control signals output from the S/P conversion block 1012 are signals processed on the semiconductor chip. Thus, if the driving ability is appropriately set, an A/D converter or other device can be prevented from being adversely effected by the control signals. Furthermore, as the control signals are internal signals processed on the semiconductor chip, the image sensor 101 can realize high-speed signal propagation without being adversely effected by an external capacity or the like.

An example embodiment forms the LVDS receiver 1011 and the imaging block 1013 on the same semiconductor chip of the image sensor 101. Therefore, a low-voltage differential signal received from the timing signal generation circuit 104 can be processed speedily in the semiconductor chip that operates under low-load conditions without emitting noises to the outside.

A modified embodiment of the exemplary embodiment is described below.

The above-described exemplary embodiment uses the start-bit part having two bits, which is added to a control signal. However, another exemplary embodiment may use a start-bit part having only one bit.

The following is a modified method according to another exemplary embodiment.

The timing signal generation circuit 104 embeds a sync signal into a data signal and transfers a data signal of only one channel to the image sensor 101. The image sensor 101 extracts a clock signal indicating one period based on a sync signal embedded in the data signal. A PLL unit equipped in the image sensor 101 generates a clock (PLL output) by multiplying the clock signal. The image sensor 101 determines data fetch timing based on the PLL output. According to this method, the number of wiring lines can be reduced to a minimum value (=2) although a large scale circuit is required for the S/P conversion block 1012 of the image sensor 101.

If the number of control signals transferred from the timing signal generation circuit 104 to the image sensor 101 is large, the multiplied frequency of one-channel data signal becomes very high. In this case, the multiplied frequency can be decreased by increasing the number of channels allocated to a data signal. The number of channels allocated to a data signal can be adequately determined considering the number of transferred control signals, the number of wiring lines, serial transfer frequency, and the circuit scale of the S/P conversion block 1012 disposed in the image sensor 101.

According to the above-described exemplary embodiment, the image sensor 101 includes the LVDS receiver 1011 and the S/P conversion block 1012 formed on the same semiconductor chip. However, the image sensor 101 according to another exemplary embodiment may include the LVDS receiver 1011 and the S/P conversion block 1012 that are separately formed on different semiconductor chips. In each exemplary embodiment according to the present invention, the wiring for the LVDS receiver 1011 and the S/P conversion block 1012 is formed with internal bonding on the same package.

Second Exemplary Embodiment

Figure 8:
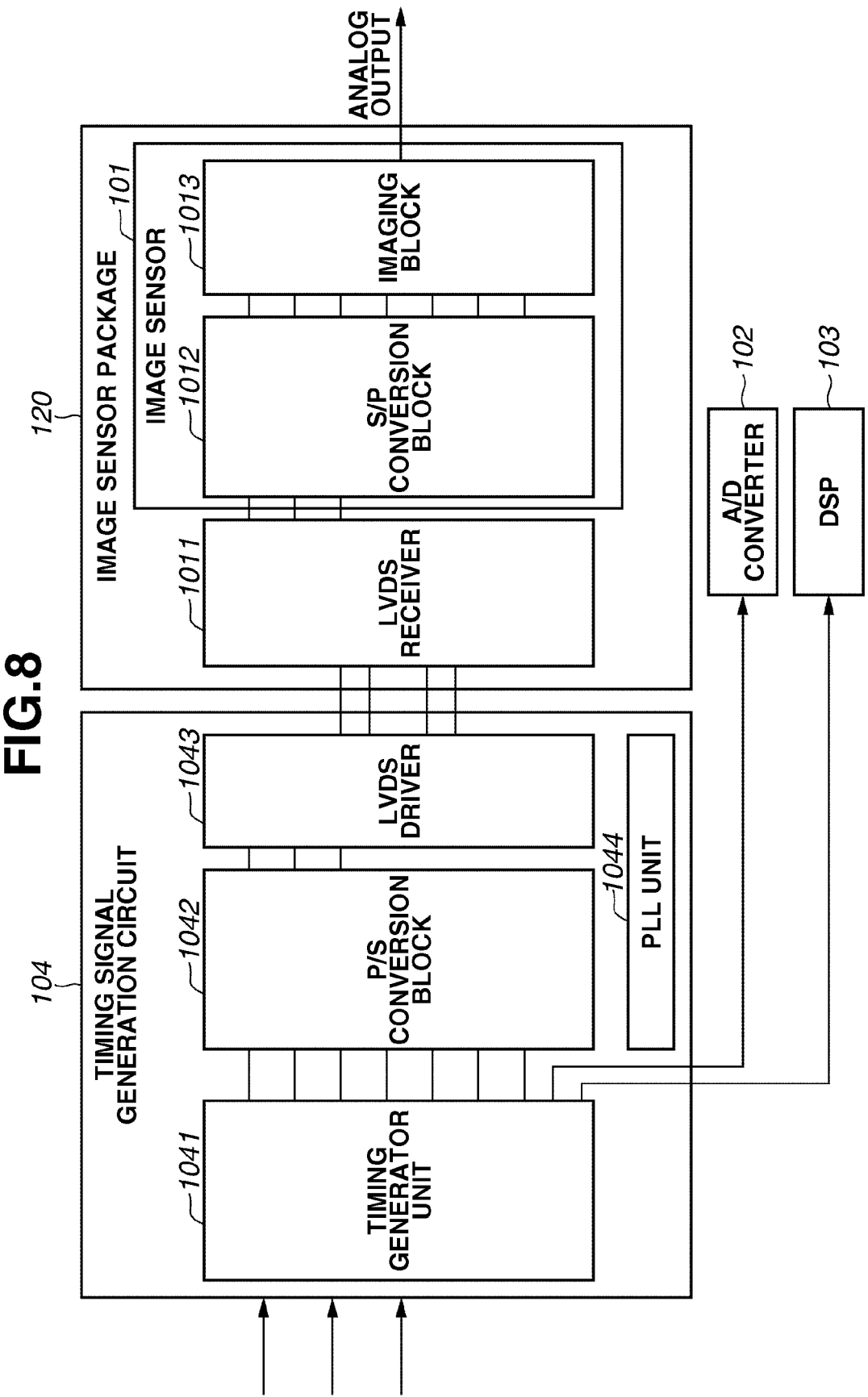
FIG. 8 is a block diagram illustrating an example connection status between an image sensor and a timing signal generation circuit of a digital camera, which serves as an imaging apparatus according to a second exemplary embodiment of the present invention.

A second exemplary embodiment of the present invention differs from the above-described first exemplary embodiment in an internal connection state of a digital camera as illustrated in FIG. 8. Other elements of this exemplary embodiment are similar to those described in the above-described first exemplary embodiment (refer to FIGS. 1 through 3).

FIG. 8 is a block diagram illustrating an example connection status between the image sensor 101 and the timing signal generation circuit 104 according to an exemplary embodiment.

As illustrated in FIG. 8, the image sensor 101 and the LVDS receiver 1011 are enclosed in an image sensor package 120. The image sensor 101 includes the S/P conversion block 1012 and the imaging block 1013, which are formed on the same semiconductor chip. The LVDS receiver 1011 is formed on another semiconductor chip. The timing signal generation circuit 104 includes the timing generator unit 1041, the P/S conversion block 1042, the LVDS driver 1043, and the PLL unit 1044, which are formed on the same semiconductor chip.

According to the above-described first exemplary embodiment, the image sensor 101 includes the LVDS receiver 1011, the S/P conversion block 1012, and the imaging block 1013, which are formed on the same semiconductor chip. According to this arrangement, if the circuit scales of the LVDS receiver 1011 and the S/P conversion block 1012 increase, a large amount of electric power is consumed in the image sensor 101 and the temperature increases. If the imaging block is formed together with another block on the same semiconductor chip, as the imaging block has a high temperature, the dark current may increase in the image sensor. In this case, if the exposure processing is performed for a long time, heat fogging may appear on a captured image due to heat generation.

On the other hand, the image sensor 101 according to the second exemplary embodiment includes the S/P conversion block 1012 and the imaging block 1013 formed on the same semiconductor chip and the LVDS receiver 1011 formed on another semiconductor chip as illustrated in FIG. 8. However, the image sensor 101 and the LVDS receiver 1011 are enclosed in the same image sensor package 120. Therefore, no wiring pattern for connecting the image sensor 101 and the LVDS receiver 1011 is provided on a circuit board. Therefore, an example embodiment can drive the image sensor 101 with a small amount of electric power consumption.

Figure 9:
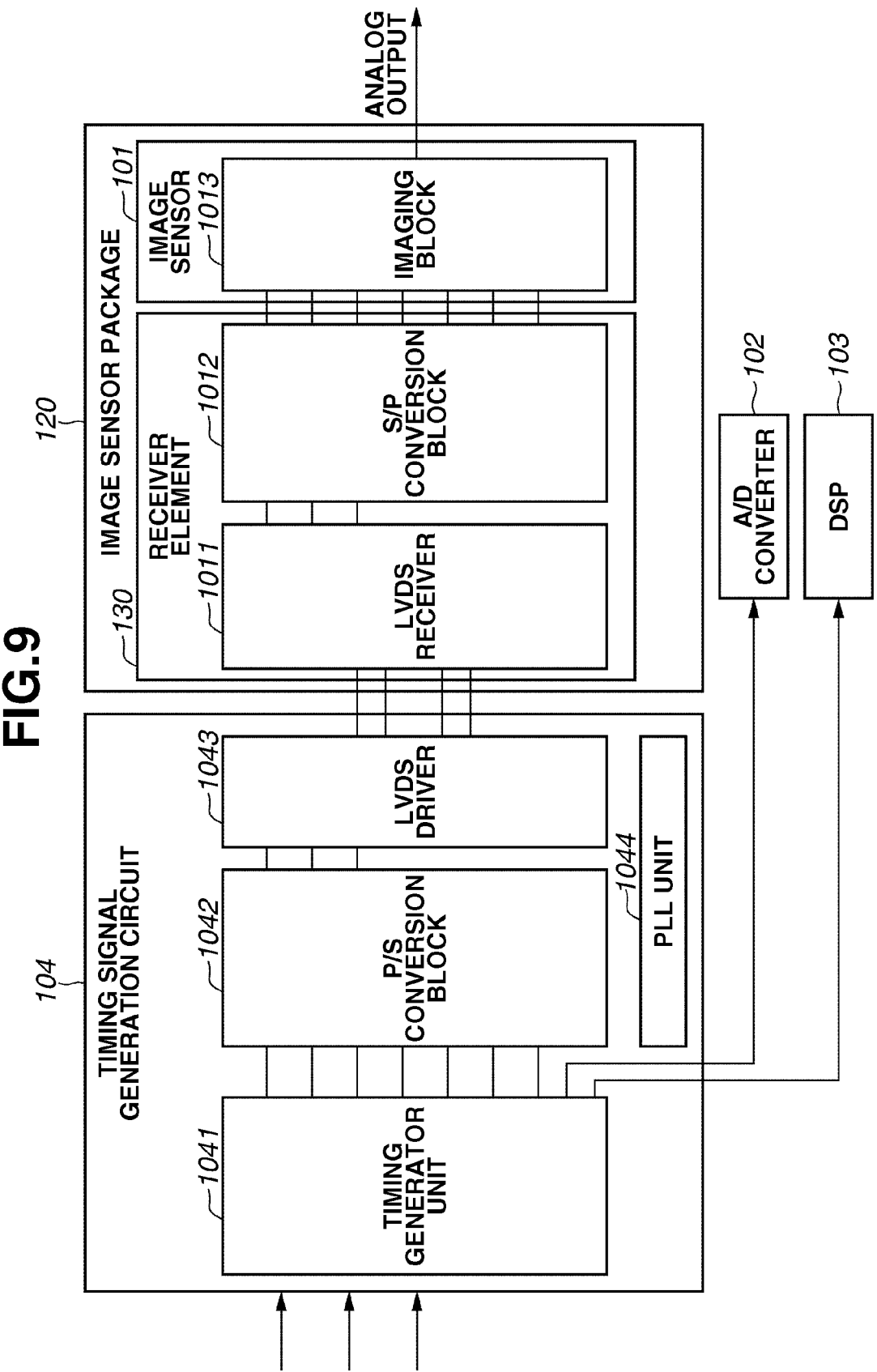
FIG. 9 is a block diagram illustrating an example connection status between an image sensor and a timing signal generation circuit according to an exemplary embodiment of the present invention.

FIG. 9 is a block diagram illustrating another example connection status between the image sensor 101 and the timing signal generation circuit 104 according to an exemplary embodiment.

An image sensor package 120 illustrated in FIG. 9 includes the image sensor 101 and a receiver element 130, which are enclosed together. The imaging block 1013 of the image sensor 101 is formed on a semiconductor chip. The LVDS receiver 1011 and the S/P conversion block 1012 are formed on another semiconductor chip. The timing signal generation circuit 104 includes the timing generator unit 1041, the P/S conversion block 1042, the LVDS driver 1043, and the PLL unit 1044, which are formed on the same semiconductor chip.

The image sensor 101 and the receiver element 130 are enclosed in the image sensor package 120. According to this arrangement, no wiring pattern for connecting the image sensor 101 and the receiver element 130 is provided on a circuit board. Therefore, an example embodiment can drive the image sensor 101 with a small amount of electric power consumption.

As described above, if the circuit scales of the LVDS receiver 1011 and the S/P conversion block 1012 increase and a large amount of electric power is consumed therein, it is desired to provide these blocks on another semiconductor chip rather than forming all of the LVDS receiver, the S/P conversion block, and the imaging block on the same semiconductor chip of an image sensor. An exemplary embodiment can integrate the image sensor 101 and the receiver element 130 as a multi-chip module with a bonding wire in the same image sensor package 120. Thus, the embodiment can obtain effects similar to those obtained when respective blocks are formed together on the same semiconductor chip.

In this case, according to the above-described arrangement for the image sensor and the receiver element enclosed in the same package, control signals from the timing signal generation circuit pass through an output pad of the receiver element, a bonding wire, and an input pad of the image sensor. Therefore, the amount of electric power consumption increases. However, compared to a method for separately packaging semiconductor chips and mounting them on a circuit board, the amount of electric power consumption in the above-described circuit is small.

An image sensor according to the present exemplary embodiment is structurally similar to a conventional image sensor. Therefore, the above-described method according to an exemplary embodiment can be directly applied to a conventional image sensor.

As described above, similar to the above-described first exemplary embodiment, an exemplary embodiment can reduce the number of terminals between a timing signal generation circuit and an image sensor, improve transmission characteristics, reduce noises generated by the timing signal generation circuit, and increase the degree of freedom in determining the mounting layout.

Third Exemplary Embodiment

Figure 10:
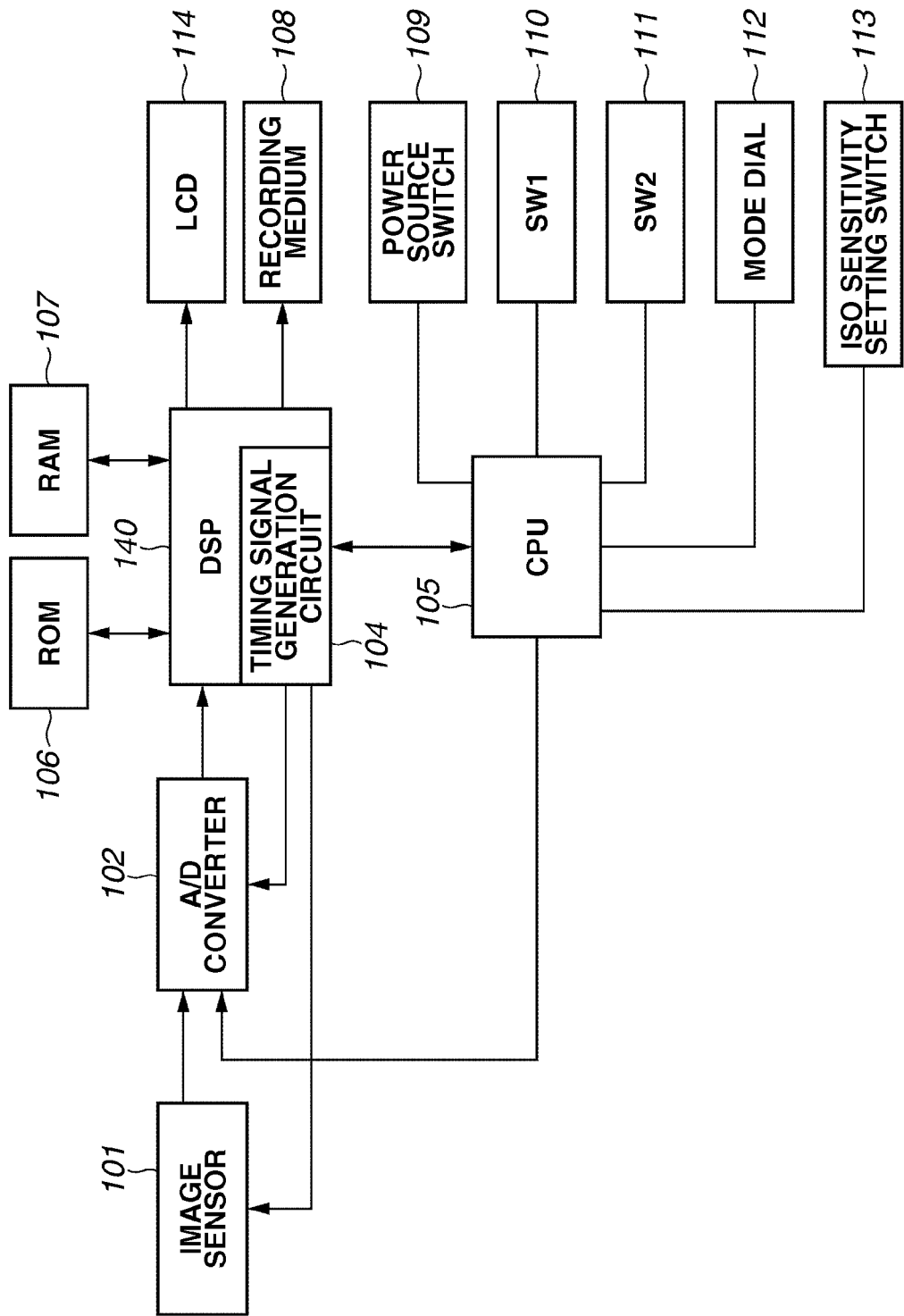
FIG. 10 is a block diagram illustrating an example configuration of a digital camera, which serves as an imaging apparatus according to a third exemplary embodiment of the present invention.

A third exemplary embodiment of the present invention provides a digital camera illustrated in FIG. 10, which is different from the digital camera according to the above-described first exemplary embodiment. Other elements of this exemplary embodiment are similar to those described in the above-described first exemplary embodiment (refer to FIGS. 2 and 3).

FIG. 10 is a block diagram illustrating an example configuration of a digital camera, which serves as an imaging apparatus according to the third exemplary embodiment.

In FIG. 10, the digital camera includes the image sensor 101, the A/D converter 102, the DSP 140, the CPU 105, the ROM 106, the RAM 107, and the recording medium 108. The DSP 140 includes the timing signal generation circuit 104. Furthermore, the digital camera includes the power source switch 109, the first shutter switch (SW1) 110, the second shutter switch (SW2) 111, the mode dial 112, the ISO sensitivity setting switch 113, and the display unit (LCD) 114.

The digital camera according to the third exemplary embodiment is different from the above-described first exemplary embodiment (FIG. 1) in that the timing signal generation circuit 104 is incorporated into the image processing DSP 140. The timing signal generation circuit 104 incorporated in the image processing DSP 140 is connected to the image sensor 101 according to low-voltage differential signaling (LVDS). In FIG. 10, constituent components similar to those illustrated in FIG. 1 are denoted by the same reference numerals.

The above-described arrangement according to an exemplary embodiment can reduce the number of terminals between the timing signal generation circuit 104 and the image sensor 101, improve transmission characteristics, and increase the degree of freedom in determining the mounting layout. The timing signal generation circuit 104 can be located away from the image sensor 101. The DSP 140 can be configured to realize the functions of the timing signal generation circuit 104.

Furthermore, the above-described arrangement according to an exemplary embodiment can greatly reduce the cost and the number of parts that are required when the timing signal generation circuit 104 and the image processing DSP are formed on different semiconductor chips. Moreover, the above-described arrangement according to an exemplary embodiment can perform high-speed processing because the control of the timing signal generation circuit 104 can be set with an internal bus of the DSP 140.

As described above, an exemplary embodiment can reduce the number of terminals between a timing signal generation circuit and an image sensor, improve transmission characteristics, and increase the degree of freedom in determining the mounting layout. The embodiment can reduce the cost and the number of parts and can realize high-speed processing.

Fourth Exemplary Embodiment

Figure 11:
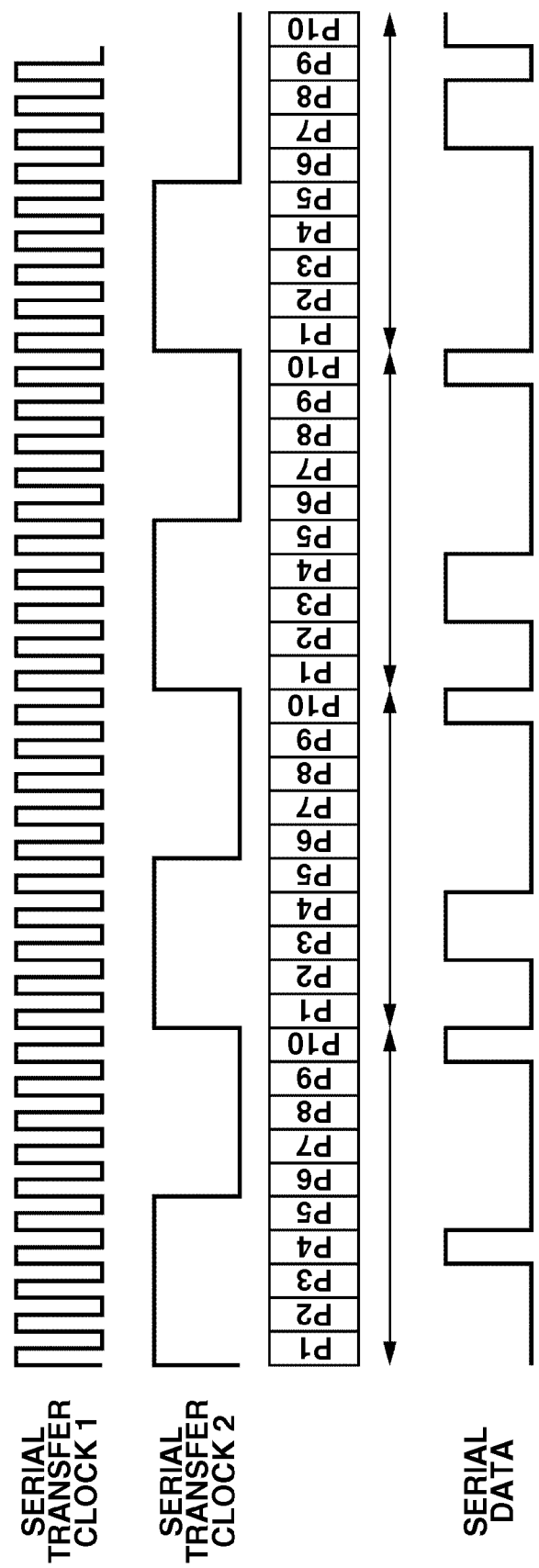
FIG. 11 is a timing diagram illustrating example generation of serial data in a digital camera, which serves as an imaging apparatus according to a fourth exemplary embodiment of the present invention.

A fourth exemplary embodiment of the present invention is different from the above-described first exemplary embodiment in that serial transfer clocks 1 and 2 illustrated in FIG. 11 are used to generate serial control signals. Other elements of this exemplary embodiment are similar to those described in the above-described first exemplary embodiment (refer to FIGS. 1 through 3).

FIG. 11 illustrates example generation of serial data according to the fourth exemplary embodiment.

In FIG. 11, the P/S conversion block 1042 of the timing signal generation circuit 104 according to an exemplary embodiment generates a plurality of clock signals (serial transfer clocks), which can be used to extract control signals for the imaging block 1013 from a multiplexed signal. More specifically, an exemplary embodiment sets two serial transfer clocks, i.e., serial transfer clock 1 and serial transfer clock 2 (reference period signals), which are used to generate a serial control signal.

According to the above-described first exemplary embodiment, to reduce the circuit scale of a CMOS image sensor, the timing signal generation circuit 104 transfers both a data signal and a serial transfer clock to the image sensor.

On the other hand, an exemplary embodiment uses the following three channels that enable the P/S conversion block 1042 of the timing signal generation circuit 104 to generate a serial control signal. The first channel is allocated to the serial transfer clock 1 that indicates the bit fetch timing. The second channel is allocated to the serial transfer clock 2 that indicates the reference period. The third channel is allocated to the data signal (serial data). Thus, the embodiment can reduce the circuit scale of the S/P conversion block 1012 provided in the image sensor 101, although the total number of wiring lines increases to 6, as illustrated in FIG. 11.

The serial transfer clock 1 is the same as the serial transfer clock described in the first exemplary embodiment. The serial data does not include the start bit and the stop bit described in the first exemplary embodiment, and can transmit a 10-bit control signal. The transmission efficiency can be further increased.

According to the above-described first exemplary embodiment, the S/P conversion block 1012 in the image sensor 101 detects a start bit and a stop bit and divides the bit stream into reference periods based on a detection result.

On the other hand, the timing signal generation circuit 104 according to an exemplary embodiment further transmits the serial transfer clock 2 (reference period signal) to the image sensor 101 according to low-voltage differential signaling (LVDS). Therefore, the S/P conversion block 1012 in the image sensor 101 is not required to detect a start bit and a stop bit. The S/P conversion block 1012 can identify a bit stream based on the serial transfer clock 1 and can identify the reference frequency based on the serial transfer clock 2. The image sensor 101 can easily extract original control signals from a signal transferred from the timing signal generation circuit 104. Although the number of wiring lines increases, the above-described arrangement is very effective in reducing the circuit scale of the S/P conversion block 1012 provided in the image sensor 101.

As described above, similar to the above-described first exemplary embodiment, an exemplary embodiment can reduce the number of terminals between a timing signal generation circuit and an image sensor, improve transmission characteristics, and reduce the circuit scale of the S/P conversion block provided in the image sensor.

Fifth Exemplary Embodiment

Figure 12:
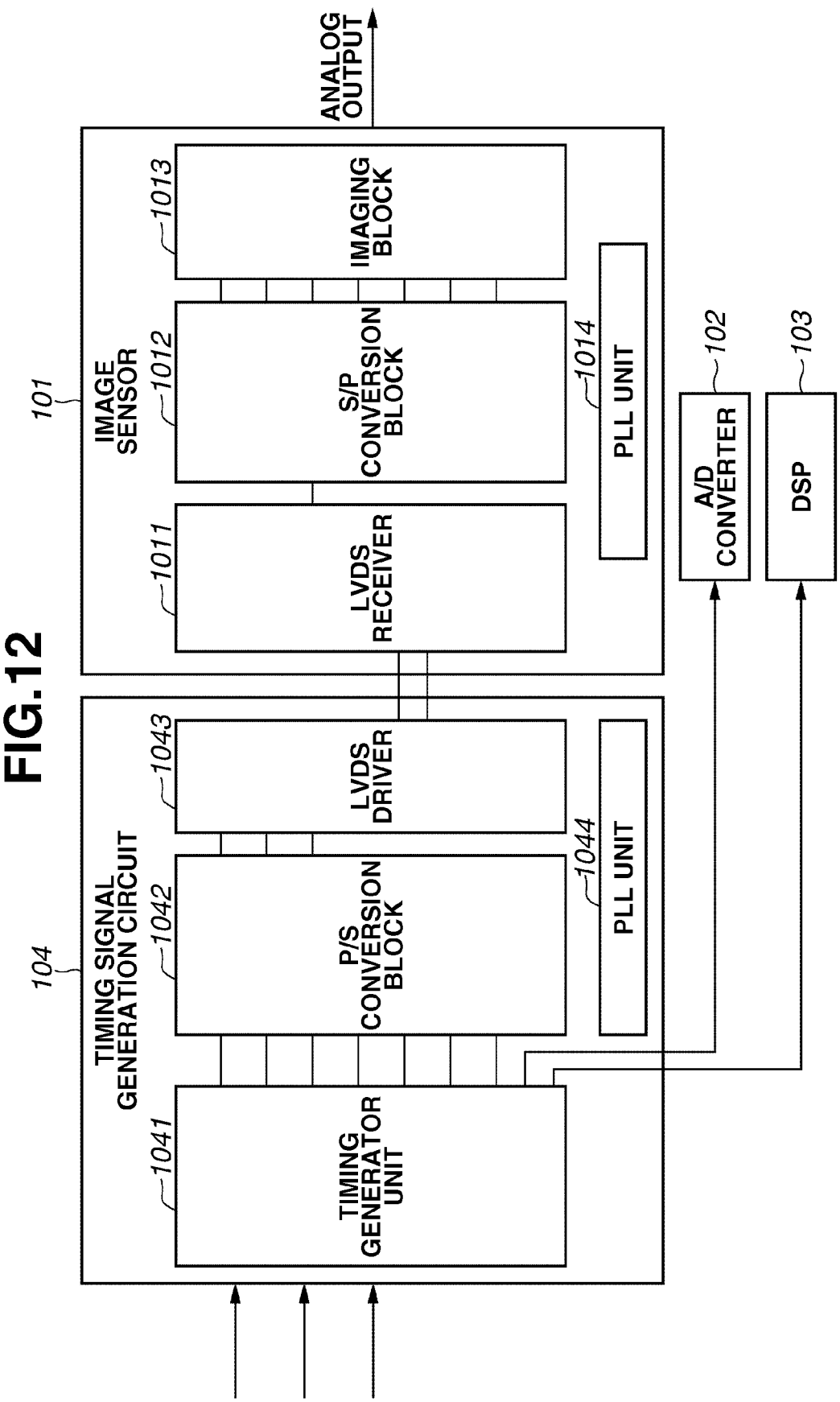
FIG. 12 is a block diagram illustrating an example connection status between an image sensor and a timing signal generation circuit of a digital camera, which serves as an imaging apparatus according to a fifth exemplary embodiment of the present invention.

A fifth exemplary embodiment of the present invention is different from the above-described first exemplary embodiment in an internal connection state of a digital camera as illustrated in FIG. 12. Other elements of this exemplary embodiment are similar to those described in the above-described first exemplary embodiment (refer to FIGS. 1 through 3).

FIG. 12 is a block diagram illustrating an example connection status between the image sensor 101 and the timing signal generation circuit 104 of a digital camera, which serves as an imaging apparatus according to the fifth example exemplary embodiment.

In FIG. 12, the image sensor 101 includes the LVDS receiver 1011, the S/P conversion block 1012, the imaging block 1013, and a PLL unit 1014, which are formed on the same semiconductor chip. The timing signal generation circuit 104 includes the timing generator unit 1041, the P/S conversion block 1042, the LVDS driver 1043, and the PLL unit 1044, which are formed on the same semiconductor chip.

According to the above-described first exemplary embodiment, to reduce the circuit scale of a CMOS image sensor, the timing signal generation circuit transfers both a data signal and a serial transfer clock to the image sensor.

On the other hand, the P/S conversion block 1042 of the timing signal generation circuit 104 according to an exemplary embodiment multiplexes only data signals to generate a serial control signal. In this case, the number of wiring lines is 2 because only one channel allocated to serial data is used for data transmission. The P/S conversion block 1042 further multiplexes clock information with a plurality of control signals. The clock information is used to extract signals for controlling the imaging block 1013 from a multiplexed signal.

In this embodiment, the S/P conversion block 1012 of the image sensor 101 requires a clock signal generation circuit (e.g., PLL unit). Therefore, as illustrated in FIG. 12, the PLL unit 1014 is additionally provided in the image sensor 101. The PLL unit 1014 generates a high-speed clock whose frequency is higher than operation frequencies of a plurality of control signals.

An example operation performed by the image sensor 101 including the PLL unit 1014 is described below with reference to FIG. 13.

Figure 13:
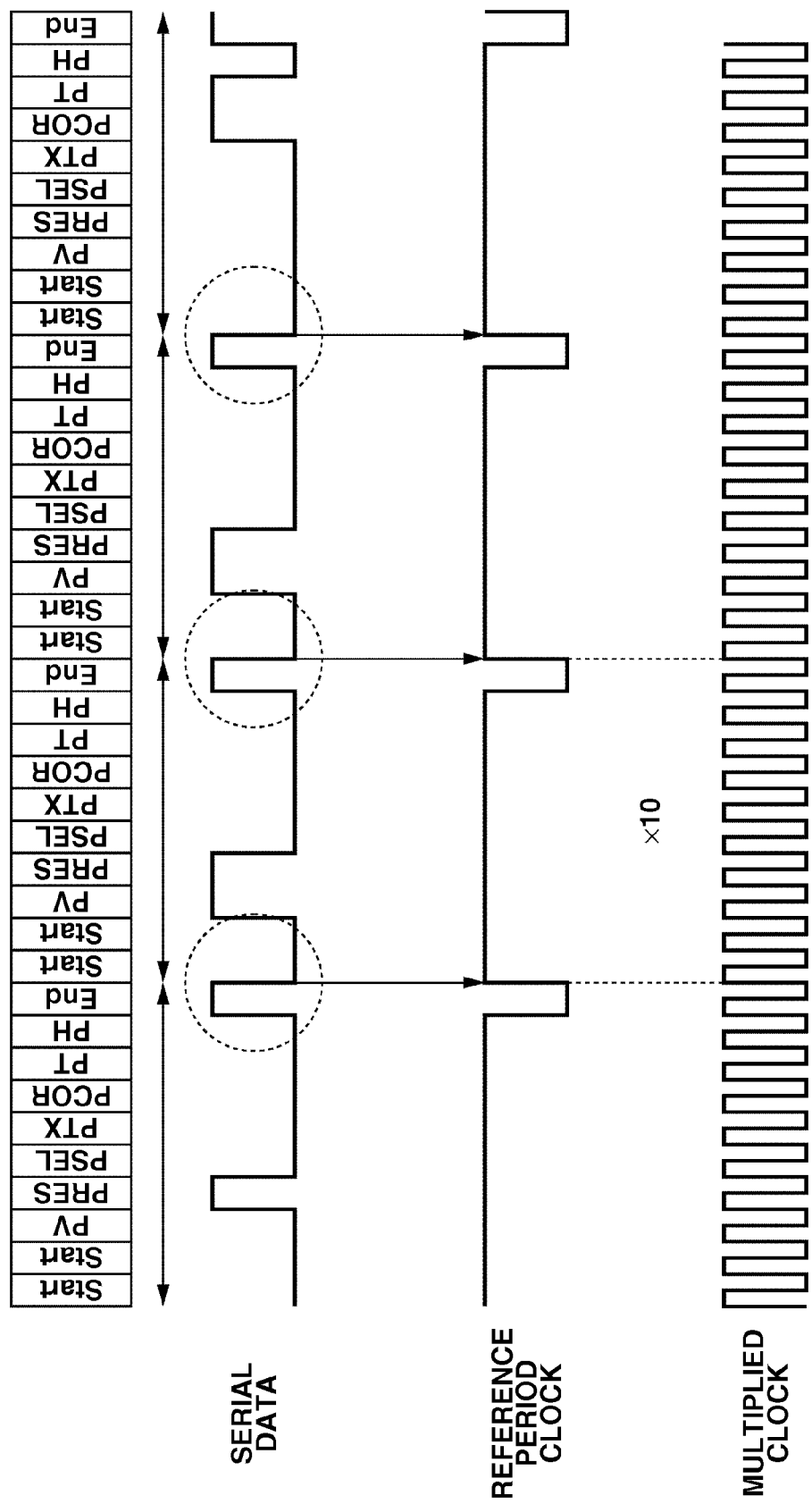
FIG. 13 is a timing diagram illustrating example generation of parallel data.

FIG. 13 is a timing diagram illustrating example generation of parallel data.

FIG. 13 illustrates serial data similar to the serial data described in the first exemplary embodiment. The image sensor 101 extracts clock information from the serial data because the image sensor 101 does not receive any serial transfer clock from the timing signal generation circuit 104.

Similar to the above-described first exemplary embodiment, the S/P conversion block 1012 of the image sensor 101 according to an exemplary embodiment detects a start-bit part having two bits and a stop-bit part having one bit from a bit stream. Furthermore, the S/P conversion block 1012 detects the data appearing at a predetermined period (reference clock period).

The S/P conversion block 1012 extracts a change in the data between the start-bit part and the stop-bit part, while enabling an output to appear during a predetermined period and masking outputs of other control pulses. The S/P conversion block 1012 supplies the obtained reference signal to the PLL unit 1014. The PLL unit 1014 generates a multiplied clock equivalent to 10 times the reference signal, which is comparable to the serial transfer clock.

An exemplary embodiment fetches serial data according to the above-described multiplied clock and extracts, from a multiplexed signal, control signals for the imaging block 1013. As the image sensor 101 additionally includes the PLL unit 1014, the circuit scale of the image sensor 101 becomes larger. However, the number of wiring lines connecting the timing signal generation circuit 104 and the image sensor 103 can be minimized. The degree of freedom in determining the layout of wiring lines can be increased.

As described above, similar to the above-described first exemplary embodiment, an exemplary embodiment can reduce the number of terminals between a timing signal generation circuit and an image sensor, improve transmission characteristics, and reduce the number of wiring lines connecting the timing signal generation circuit and the image sensor.

Other Exemplary Embodiment

The imaging apparatus described in the above-described exemplary embodiments is a digital camera. However, another exemplary embodiment can use a digital video camera as an imaging apparatus according to the present invention.

Furthermore, the package of an image sensor and the method of wiring between a plurality of chips, described in the exemplary embodiments, are not limited to those described above. For example, a lead frame, an interposer, or the like, other than bonding wiring, can be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-178534 filed Jul. 6, 2007, which is hereby incorporated by reference herein in its entirety.

What is claimed is:

1. An imaging apparatus comprising:
    an image sensor having a plurality of pixels, with each of the pixels having a photodiode, an amplifier, a transfer switch for transferring a charge generated by the photodiode, a reset switch for resetting input from the amplifier to a predetermined voltage, and a scanning circuit for providing driving pulses to each of the plurality of pixels;
    a first conversion unit configured to multiplex input signals including control signals for driving an image sensor to generate a multiplexed signal having a frequency higher than those of the input signals;
    a transfer unit configured to transfer the multiplexed signal generated by the first conversion unit according to low-voltage differential signaling;
    a reception unit configured to receive the multiplexed signal from the transfer unit;
    a second conversion unit configured to extract the control signals for driving the image sensor from the multiplexed signal received by the reception unit and provide the control signals to the scanning circuit of the image sensor;
    a third conversion unit configured to perform at least one of correction processing and development processing on a signal generated by the image sensor; and
    a signal generation unit configured to generate and supply processing timing control signals to the first conversion unit and the third conversion unit,
    wherein the image sensor and the second conversion unit are formed on the same semiconductor chip and the control signals for driving the image sensor include a transfer pulse for switching the transfer switch and a reset pulse for switching the reset switch.

2. The imaging apparatus according to claim 1, wherein the image sensor includes a complementary metal-oxide semiconductor image sensor.

3. The imaging apparatus according to claim 1, wherein the first conversion unit is configured to multiplex the control signals with information that is used to extract the control signals for driving the image sensor from the multiplexed signal.

4. A method for controlling an imaging apparatus including an image sensor having a plurality of pixels, with each of the pixels having a photodiode, an amplifier, a transfer switch for transferring a charge generated by the photodiode, a reset switch for resetting input from the amplifier to a predetermined voltage, and a scanning circuit for providing driving pulses to each of the plurality of pixels, the method comprising:
    multiplexing input signals including control signals for driving an image sensor to generate a multiplexed signal having a frequency higher than those of the input signals;
    transferring the generated multiplexed signal according to low-voltage differential signaling;
    receiving the transferred multiplexed signal;
    extracting the control signals for driving the image sensor from the received multiplexed signal;
    providing the control signals to the scanning circuit of the image sensor;
    performing at least one of correction processing and development processing on a signal generated by the image sensor; and
    generating and supplying processing timing control signals used for generation of the multiplexed signal and the at least one of correction processing and development processing,
    wherein the image sensor and the extracted control signals are formed on the same semiconductor chip, and the control signals for driving the image sensor include a transfer pulse for switching the transfer switch and a reset pulse for switching the reset switch.

5. An imaging apparatus comprising:
    a timing generator unit;
    a parallel to serial (P/S) conversion block;
    a low-voltage differential signaling (LVDS) driver;
    an LVDS receiver;
    a serial to parallel (S/P) conversion block; and
    an imaging block,
    wherein the S/P conversion block and the imaging block are formed on the same semiconductor chip and control signals for driving the imaging block include a transfer pulse for switching a transfer switch and a reset pulse for switching a reset switch.

* * * * *